A light guide plate used for an LED backlight source. The LED backlight source comprises a plurality of LED lamps. The light guide plate comprises a light guide plate body (24). The light guide plate body (24) is provided thereon with a plurality of dots (242), and there is a light guide region in the light guide plate body (24). In the light guide region, the diameters of the dots in the same dot row progressively increase from the middle to either side, and diameters of the dots in the same dot column progressively increase in the direction away from the LED lamps.

(12) United States Patent
Wu et al.

(10) Patent No.: US 9,164,224 B2
(45) Date of Patent: Oct. 20, 2015

(54) LIGHT GUIDE PLATE, BACKLIGHT SOURCE AND LIQUID CRYSTAL DISPLAY DEVICE

(71) Applicant: BEIJING BOE OPTOELECTRONICS TECHNOLOGY CO., LTD., Beijing (CN)

(72) Inventors: Yanping Wu, Beijing (CN); Fei Shang, Beijing (CN); Daekeun Yoon, Beijing (CN); Guanghui Xiao, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 125 days.

(21) Appl. No.: 14/127,931

(22) PCT Filed: Mar. 15, 2013

(86) PCT No.: PCT/CN2013/072751
§ 371 (c)(1),
(2) Date: Dec. 19, 2013

(87) PCT Pub. No.: WO2013/149546
PCT Pub. Date: Oct. 10, 2013

(65) Prior Publication Data
US 2014/0218970 A1 Aug. 7, 2014

(30) Foreign Application Priority Data
Apr. 6, 2012 (CN) ............ 2012 2 0143803 U (51) Int. Cl.
*F21V 8/00* (2006.01)
*G02F 1/1333* (2006.01)
*G02F 1/1335* (2006.01)

(52) U.S. Cl.
CPC ............ *G02B 6/0073* (2013.01); *G02B 6/0021* (2013.01); *G02B 6/0061* (2013.01); *G02F 1/133615* (2013.01); *G02B 6/0036* (2013.01); *G02B 6/0068* (2013.01)

(58) Field of Classification Search
CPC .. G02B 6/0073; G02B 6/0021; G02B 6/0061; G02F 1/133615
USPC .................................................. 362/612, 615
See application file for complete search history.

(56) References Cited

U.S. PATENT DOCUMENTS

2004/0130515 A1* 7/2004 Chuang et al. .................. 345/82
2014/0218970 A1 8/2014 Wu et al.

FOREIGN PATENT DOCUMENTS

CN 202484730 U 10/2012
CN 202521499 U 11/2012

OTHER PUBLICATIONS

International Search Report (Chinese language) issued by the State Intellectual Property Office on Jun. 3, 2013 for PCT/CN2013/072751, 13 pages.

(Continued)

*Primary Examiner* — David V Bruce
(74) *Attorney, Agent, or Firm* — Ladas & Parry LLP (57) ABSTRACT

A light guide plate used for an LED backlight source. The LED backlight source comprises a plurality of LED lamps. The light guide plate comprises a light guide plate body (24). The light guide plate body (24) is provided thereon with a plurality of dots (242), and there is a light guide region in the light guide plate body (24). In the light guide region, the diameters of the dots in the same dot row progressively increase from the middle to either side, and diameters of the dots in the same dot column progressively increase in the direction away from the LED lamps.

13 Claims, 5 Drawing Sheets

(56) References Cited

OTHER PUBLICATIONS

English abstract of CN202521499U, listed above, 1 page.
English abstract of CN202484730U, listed above, 1 page.

International Preliminary Report on Patentability issued by the International Bureau of WIPO on Oct. 7, 2014 for International Application No. PCT/CN2013/072751, 9 pages.
International Search Report for International Application No. PCT/CN2013/072751, 13pgs.

* cited by examiner

LIGHT GUIDE PLATE, BACKLIGHT SOURCE AND LIQUID CRYSTAL DISPLAY DEVICE

CROSS REFERENCE TO RELATED APPLICATIONS

This application is based on International Application No. PCT/CN2013/072751 filed on Mar. 15, 2013, which claims priority to Chinese National Application No. 201220143803.9 filed on Apr. 6, 2012, the contents of which are incorporated herein by reference.

FIELD OF THE INVENTION

Embodiments of the present invention relate to a light guide plate, a backlight source and a liquid crystal display device.

BACKGROUND

The light-emitting diode (LED) luminescence technique has become popular due to the advantages of energy saving, non-radiation, long service life and the like. Particularly in the manufacturing industry of LCD devices, backlights of the LCD devices have gradually applied LEDs instead of the previously applied cold cathode fluorescent lamps (CCFL). Currently, the types of the LED backlight sources are mainly divided into direct-lit type and side-lit type, wherein side-lit type LED backlight sources are applied by more and more LCD device manufacturers due to the advantages of a small number of adopted LEDs, advantageous heat dissipation, low thickness and the like.

Figure 1:
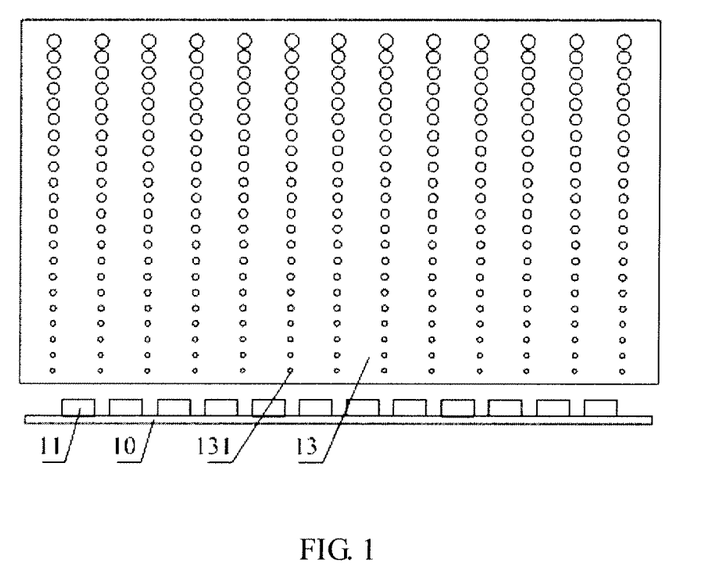
FIG. 1 is a schematic structural view of an existing side-lit type LED backlight source.

FIG. 1 is a schematic structural view of a side-lit type LED backlight source in the prior art.

As illustrated in FIG. 1, the side-lit type LED backlight source comprises: a light bar 10, a plurality of LED lamps 11 mounted on the light bar, and an LGP (Light Guide Plate) 13 corresponding to the LED lamps 11, wherein a plurality of dots 131 arranged at intervals are disposed on the light guide plate 13 and configured to change the direction of light emitted by the LED lamps 11 at a side by means of reflection, scattering and the like, so that the light can enter a display screen of an LCD device.

The light guide plate 13 is a necessary component of the side-lit type LED backlight source as the light guide plate 13 affects the subjective effect for the side-lit type LED backlight source: the brightness uniformity. Whether the LCD device has hotspot (brightness unevenness) and the uniformity degree of the screen brightness of the LCD device after the light guide plate 13 is applied are important evaluation criteria for the quality of the light guide plate 13.

The inventor found that: only the longitudinal distance between the LEDs and the dots 131 is considered in the diameter design of the dots 131 disposed at different positions of the traditional light guide plate 13. Since the light emitted from LEDs is weaker and weaker in the direction away from the LEDs and dots 131 with larger diameter exhibit better light-educing performance, dots 131 with larger diameter are provided more far away from the LEDs, and hence the uniformity of light emitted from the light guide plate 13 can be guaranteed as much as possible.

Figure 2:
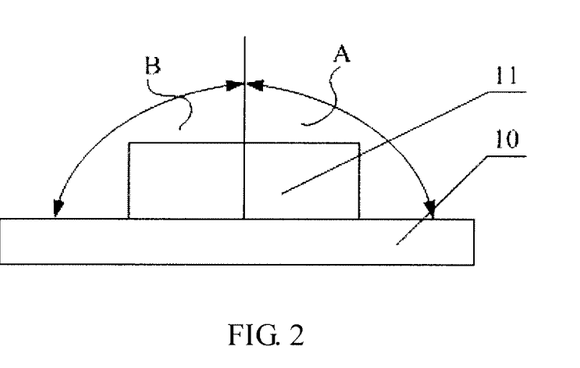
FIG. 2 is a schematic diagram of a light-emitting region of an LED lamp.

The schematic diagram of a light-emitting region of the LED lamp 11 as shown in FIG. 2 is obtained based on the result of the light-emitting test of the LED lamp 11 made by those skilled in the art, wherein the vertical up direction represents the 0° light-emitting direction; the horizontal left direction represents the 90° light-emitting direction; and the horizontal right direction represents the −90° light-emitting direction. As illustrated in FIG. 2, the light-emitting region of the LED lamp 11 includes a −90°-0° area A and a 0°-90° area B, and the main light-emitting region of the LED lamp 11 is ranged from −50° to 50°, wherein the intensity of the light in the 0° direction is the strongest; the intensity of the light at the angle ranges of −90° to −50° and 50° to 90° is weaker; and the 0° direction can be referred to as the central light-emitting direction of the LED lamp. However, as illustrated in FIG. 1, in the existing light guide plate 13, with regard to an LED lamp 11, as transversely arranged dots 131 on the light guide plate 13, with the same vertical distance from the LED lamp 11, have the same diameter, the intensity of the light transmitted onto dots 131 at the angle ranges of −90° to −50° and 50° to 90° of the LED lamp 11 is obviously lower than that of the light transmitted onto dots at the angle range of −50° to 50° of the LED lamp 11, thus resulting nonuniformity of the light emitted form the light guide plate 13.

Therefore, how to provide a light guide plate, a backlight source and an LCD device, with high uniformity of emergent light, is a technical problem to be solved by those skilled in the art.

SUMMARY

The embodiments of the present invention provides a light guide plate for improving the uniformity of emergent light of the light guide plate.

An embodiment of the present invention provides a light guide plate for an LED backlight source, wherein the LED backlight source comprises a plurality of LED lamps arranged in a row in the first direction, and an LED lamp gap is formed between every two adjacent LED lamps; the light guide plate comprises a light guide plate body with a plurality of dots disposed thereon which are arranged in the first direction to form a plurality of dot rows and arranged in the second direction perpendicular to the first direction to form a plurality of first dot columns and a plurality of second dot columns, wherein each of the first dot column corresponds to one of the LED lamps; each of the second dot column corresponds to one of the LED lamp gaps; a light guide region is presented in the light guide plate body and is defined by taking centerlines of two adjacent LED lamp gaps as boundaries; and in the light guide region, the diameter of the dots in the same dot row is progressively increased from the middle to both sides, and the diameter of the dots in the same dot column is progressively increased along the direction far away from the LED lamp.

Optionally, in the light guide region, the diameter of the dots in the same row is linearly increased along the direction far away from the LED lamp.

Optionally, in the light guide region, in the light guide region, the diameter of the dots in the same dot column is linearly increased along the direction far away from the LED lamp.

In some embodiments of the present invention, a plurality of projections which are good in light transmission are formed on a light-incident side of the light guide plate body; the refractive index of material for making the projections is greater than the refractive index of air; and a slot space is formed by inner sides of two adjacent projections.

Optionally, the plurality of the projections are located to correspond to the plurality of the second dot columns respectively.

Optionally, the projections are made of PMMA or PC.

Optionally, the inside of the slot space is rectangular in shape.

Optionally, the bottom of the slot space is cambered in shape.

Another embodiment of the present invention provides an LED backlight source comprising a bar and a plurality of LED lamps uniformly mounted on the light bar, the LED backlight source further comprising the light guide plate according to claim 1, wherein the light guide plate comprises a plurality of the light guide regions corresponding to the LED lamps respectively.

Optionally, in the LED backlight source, a plurality of projections which are good in light transmission are formed on a light-incident side of a light guide plate body; the refractive index of material for making the projections is greater than the refractive index of air; a slot space are formed by inner sides of every two adjacent projections; each of the LED lamps is independently disposed in one of the slot spaces; and each projection is independently disposed in one of the LED lamp gaps.

Optionally, the width of the projection is less than the gap between two adjacent LED lamps; the transverse distance of the inside of the slot space is greater than the length of the LED lamp; and the depth of the slot space is greater than the height of the LED lamp.

Still another embodiment of the present invention provides an LCD device, which comprises the above described LED backlight source.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

It should be stated at first that: the position words "horizontal", "vertical", "up", "down", "left", "right", "transverse", "longitudinal" and the like in the previous and following description are only based on the orientation as shown in the figures, only used for the convenience of description, and do not intend to be limitative.

As the influence of the light-emitting angle and the arrangement gap of LED lamps on the light intensity distribution of a light guide plate is not considered in the design of dots in the existing light guide plate, the nonuniformity of emergent light of the light guide plate can be caused. Therefore, the embodiment of the present invention provides a light guide plate for improving the uniformity of emergent light of the light guide plate. In the designing of dots arrangement on the light guide plate for the LED backlight sources of embodiments of the present invention, according to the light-emitting angle and the arrangement gap of the LED lamps, dots in regions with weaker intensity of emergent light of LED lamps and arrangement gap regions of the LED lamps have increased diameter so that the intensity of emergent light via the dots on these regions can be increased. Hence, the light intensity difference between the intensity of light guided to the LCD from regions of the light guide plate with stronger and the intensity of light guided to the LCD from the regions of the light guide plate with weaker light intensity can be reduced or eliminated, thus improving the uniformity of the emergent light of the light guide plate.

Figure 4:
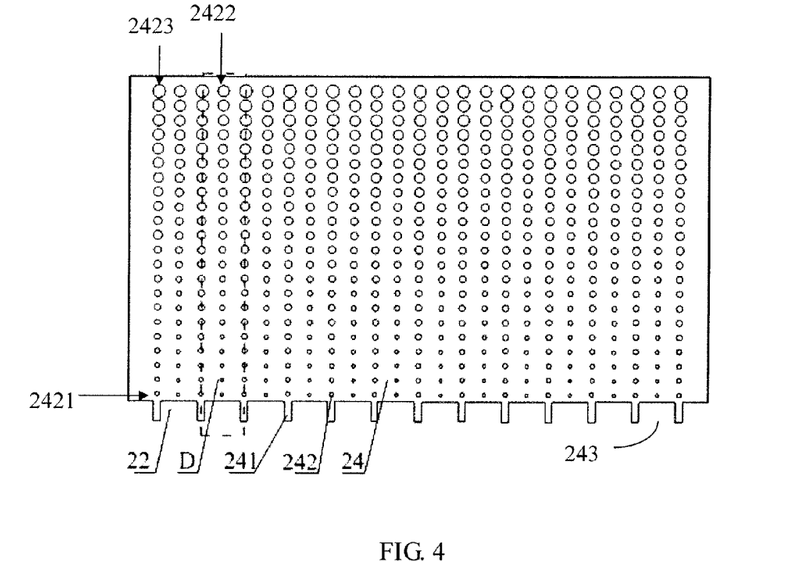
FIG. 4 is a schematic structural view of a light guide plate provided by an embodiment of the present invention.

FIG. 4 is a schematic structural view of a light guide plate for an LED backlight source provided by an embodiment of the present invention. The light guide plate provided by the embodiment of the present invention is used together with a plurality of LED lamps arranged in a row in the transverse direction, wherein an LED lamp gap is formed between every two adjacent LED lamps. The light guide plate provided by the embodiment of the present invention comprises a light guide plate body 24. A plurality of LED mounting positions 243 are disposed on a light-incident side of the light guide plate body 24 and correspond to light-emitting surfaces of a plurality of the LED lamps respectively. A plurality of dots 242 are disposed on the light guide plate body 24 (for instance, on the light-emitting surface of the light guide plate body 24). These dots 242 are arranged in the transverse direction to form a plurality of dot rows 2421 and arranged in the longitudinal direction perpendicular to the transverse direction to form a plurality of first dot columns 2422 and a plurality of second dot columns 2423, wherein each first dot column 2422 corresponds to an LED lamp; and each second dot column 2423 corresponds to an LED lamp gap. In the embodiment, for instance, each first dot column 2422 corresponds to the central light-emitting direction of an LED lamp, and each second dot column 2423 corresponds to the centerline of an LED lamp gap. In other embodiments, a plurality of the first dot columns 2422 can correspond to one LED lamp. The light guide plate body 24 includes a plurality of light guide regions corresponding to a plurality of the LED lamps, wherein a light guide region D corresponding to a certain LED lamp is defined by taking the centerlines of two LED gaps on both sides of the LED lamp as boundary (the region as shown by the dotted lines in FIGS. 4 and 5); and in each light guide region D, the diameter of the dots 242 in the same row is progressively increased from the middle to both sides in the direction parallel to the arrangement direction of a plurality of the LED lamps 21, and the diameter of the dots in the same column is progressively increased in the direction far away from the corresponding LED lamp.

In the usage of the light guide plate provided by the embodiment of the present invention, a plurality of the LED lamps are respectively mounted at the plurality of the LED lamp mounting positions 243. By taking the light-emitting angle of an LED lamp 21 and an gap of a LED backlight source as an example, in the transverse direction, the light emitted from the main light-emitting region of the LED lamp 21 at the angle ranging from approximately −50° to 50° is educed via the corresponding dots 242 which have smaller diameter and are close to the central portion of the light guide region D of the LED lamp 21, and the weaker light emitted from the LED lamp 21 at the angle ranging from −90° to −50° and from 50° to 90° and the light at the gap of the LED lamp 21 are educed via the corresponding dots 242 which have larger diameter and are close to both sides of the light guide region D of the LED lamp 21. In the longitudinal direction, the light emitted by the LED lamp 21 is firstly educed via the dots 242 which are close to the LED lamp 21 and have small diameter. And, the intensity of the remaining light is gradually reduced. As the diameter of the dots 242 is gradually increased with larger distance from the LED lamp 21, the light with weaker intensity is educed via the dots 242 with large diameter.

The dot 242 with larger diameter has better performance in eduction of light. Therefore, in a light guide region D, the light educed via the dots 242 with small diameter and the light educed via the dots 242 with large diameter are basically equal to each other, and hence the uniformity of emergent light of the light guide region D can be guaranteed. As the light guide plate can be seen as a combination of a plurality of the light guide regions D, the whole light guide plate has good uniformity of emergent light.

Therefore, the light guide plate provided by the embodiment of the present invention has good uniformity of emergent light.

Optionally, the diameter of the dots 242 in the same dot column within the light guide region D is linearly increased in the direction far away from the LED lamp 21.

For instance, the diameter of the dots 242 in the same dot row is linearly increased from the middle to both sides within a light guide region D corresponding to an LED lamp, and can be represented by a formula $y=ax+b$, wherein:

x indicates the distance from a location to the central light-emitting direction of the LED lamp 21. As for the central light-emitting direction of the LED lamp 21, the corresponding x value is 0; when the pitch between two adjacent LED lamps 21 is set to be L, the value range of x is $0 \leq x \leq L/2$;

a is a constant and is 0.1 as for PMMA material;

b indicates the diameter of the dots 242, at the central light-emitting direction of the LED lamp 21, in the dot row; and y indicates the diameter of the dots 242 at the location.

Figure 3:
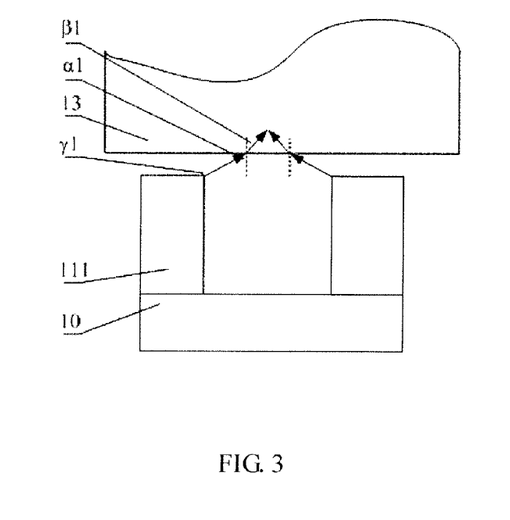
FIG. 3 is a schematic diagram illustrating the refraction of incident light by an existing light guide plate.
Figure 6:
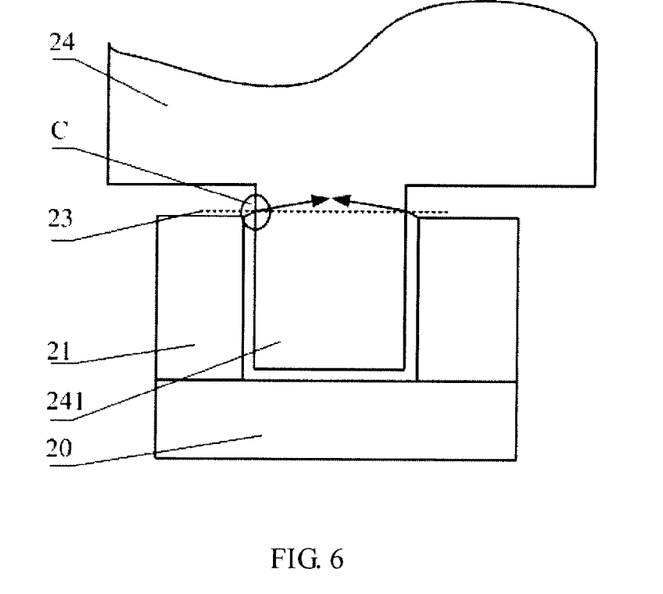
FIG. 6 is a schematic structural view illustrating the refraction of incident light by a light guide plate provided by an embodiment of the present invention.
Figure 7:
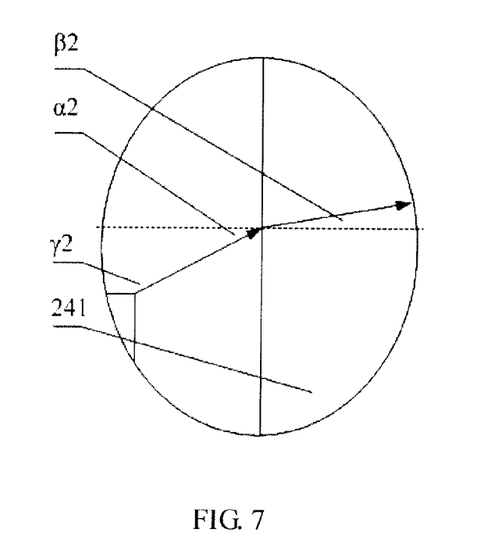
FIG. 7 is an enlarged view of a portion C of FIG. 6.

Moreover, in order to reduce the light mixing distance, in the light guide plate, of the light emitted by the LED lamps 21, improve the uniformity of emergent light of the light guide plate and prevent the hotspot phenomenon, a plurality of projections 241 which are extended downwards and good in light transmission are formed on the lower side of the light guide plate body 24; the refractive index of material for making the projections 241 is greater than the refractive index of air; and a slot space 22 is formed by opposite sides of two adjacent projections 241 and the lower side of the light guide plate body 24. After the LED backlight source is assembled, the LED lamps 21 are disposed within the slot spaces 22. The principle of light refraction via the projections 241 is as follows:

As illustrated in FIGS. 3, 6 and 7, FIG. 3 is a schematic diagram illustrating the refraction of incident light via the existing light guide plate; FIG. 6 is a schematic structural view illustrating the refraction of incident light via the light guide plate provided by the embodiment of the present invention; and FIG. 7 is an enlarged view of portion C of FIG. 6. By comparison of FIGS. 3 and 6, the emission angle γ1 and γ2 of light are the same. As illustrated in FIG. 3, in the existing LED backlight source, when the light beam emitted from one LED lamp at an angle ranging from 50° to 90° and the light beam emitted from the other LED lamp adjacent to the one LED lamp at an angle from −90° to −50° enter the light guide plate, the refraction angle β1 is less than the incident angle α1; and as an interface of the light guide plate and the air is horizontal, the two light beams are refracted and further deviated upwards respectively, so that a mixed point of the two light beams accordingly moves upwards. As illustrated in FIGS. 6 and 7, in the light guide plate provided by the embodiment of the present invention, when the light beam emitted from one LED lamp 21 at an angle ranging from 50° to 90° and the light beam emitted from the other LED lamp 21 adjacent to the one LED lamp at an angle from −90° to −50° enter the light guide plate, the refraction angle β2 is less than the incident angle α2; and as an interface of the projections 241 and the air is vertical, the two light beams emitted by the two adjacent LED lamps (for instance, the two light beams have same incident angle relative to the projections 241) are refracted and hence deviated downwards respectively, so that a mixed point of the two light beams accordingly moves downwards. Therefore, compared to the existing light guide plate, the light guide plate provided by the embodiment of the present invention reduces the light mixing distance of the light emitted by the LED lamps 21, and hence can prevent the hotspot phenomenon at the lower side of the light guide plate body 24 due to unfinished light mixing process.

Optionally, the projections 241 are made of PMMA or PC; the refractive index of the PMMA (Polymethyl methacrylate) is 1.49; the refractive index of the PC (Polycarbonate) is 1.59; and both PMMA and PC can satisfy the refraction requirement.

Figure 8:
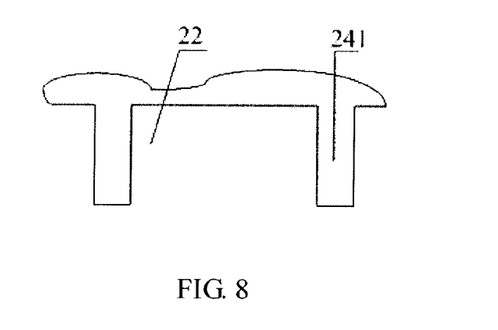
FIG. 8 is a schematic structural view of one type of projections in a light guide plate provided by an embodiment of the present invention.

Optionally, as illustrated in FIG. 8 which shows an exemplary structure of projections in an light guide plate provided by an embodiment of the present invention, the inside of the slot space 22 formed by two adjacent projections may be rectangular in shape.

Figure 9:
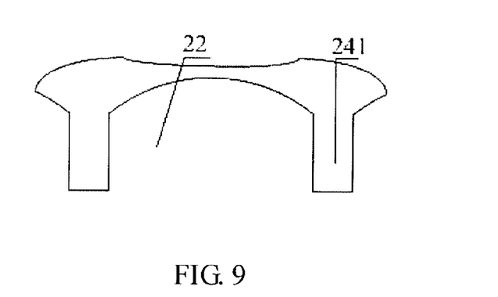
FIG. 9 is a schematic structural view of the another type of projections in a light guide plate provided by an embodiment of the present invention.

Of course, as illustrated in FIG. 9 which shows another exemplary structure of the projections in the light guide plate provided by the embodiment of the present invention, the bottom of the slot space 22 can also be cambered in shape. Due to the cambered structure, the refractive index for the light emitted from the LED lamp 21 at an angle ranging from −50° to 50° is low, which is advantageous for scattering of the light in the region, and hence the light intensity of regions with strong light intensity can be reduced.

Figure 5:
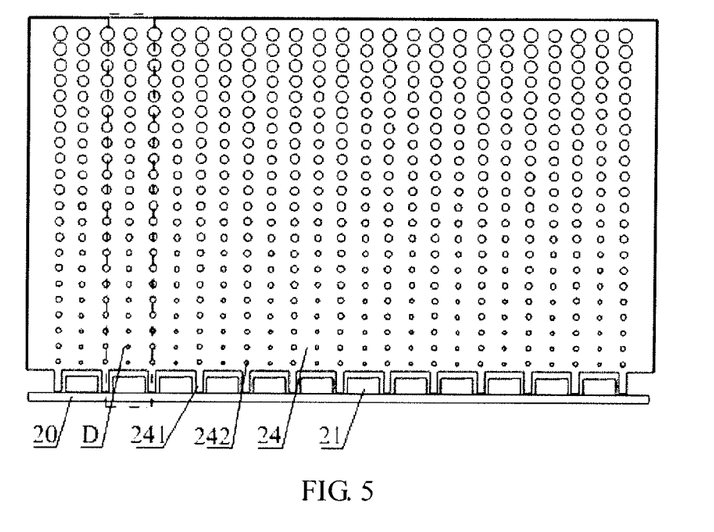
FIG. 5 is a schematic structural view of an LED backlight source provided by an embodiment of the present invention.

Another embodiment of the present invention further provides an LED backlight source. As illustrated in FIG. 5, the LED backlight source comprises a plurality of LED lamps 21 and a bar 20, wherein the LED lamps 21 are uniformly mounted onto the bar 20. The LED backlight source further comprises the light guide plate provided by the above technical schemes, wherein light guide regions D of the light guide plate correspond to the LED lamps 21 respectively.

As the light guide plates provided in the above technical schemes have good uniformity of emergent light, the LED backlight source employing the light guide plate also has good uniformity of emergent light.

When the light guide plate is provided with the projections 241, the light emitted from the LED lamps 21 can be well refracted by the projections 241, and hence the light mixing distance in the LED backlight source can be reduced, and consequently the possibility of the hotspot phenomenon in the LED backlight source can be reduced, and the principle thereof will not be further described herein.

In order to utilize the projections 241, to the largest extent, to refract the light emitted from the LED lamps 21 at larger emission angle and hence reduce the light mixing distance in the LED backlight source. Optionally, each LED lamp 21 is independently disposed in a slot space 22, and each projection 241 is disposed in a gap between two adjacent LED lamps 21.

Figure 10:
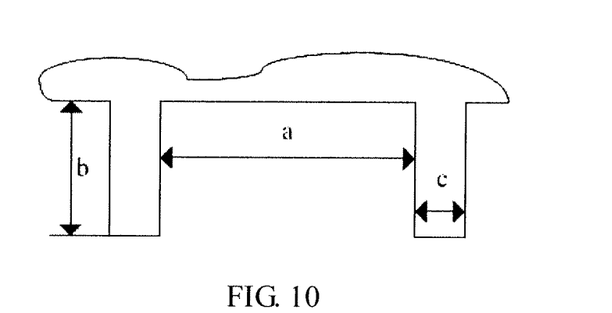
FIG. 10 is a dimensional drawing of a slot space in a light guide plate provided by an embodiment of the present invention.

Of course, the LED lamps 21 will dissipate a large amount of heat in the long-term use. In order to protect the projections 241 of the light guide plate from being burned out due to overhigh temperature, the projections 241 and the light guide plate body 24 can both be set to do not form a direct contact with the LED lamps 21. In this case, there is a certain requirement on the specific dimension of the projections 241. As illustrated in FIG. 10 which is a schematic diagram showing the dimensions of the slot space of an light guide plate provided by an embodiment of the present invention, the width c of the projection 241 is less than the gap between the two adjacent LED lamps 21; the transverse distance of the inside of the slot space 22 is greater than the length of the LED lamp 21; and the depth b of the slot space 22 is greater than the height of the LED lamp 21.

Moreover, an embodiment of the present invention further provides an LCD device comprising the above described LED backlight source. The liquid crystal display device can be a liquid crystal display TV, a liquid crystal display equipment, a mobile phone, a tablet PC, a digital picture frame and any other product or component requiring a LED backlight source.

When the display device is a liquid crystal display device, in the liquid crystal display device, a thin-film transistor (TFT) array substrate and an opposing substrate are arranged provided to be opposite to each other so as to form a liquid crystal cell which is filled with liquid crystal materials. The opposing substrate is, for instance, a color filter substrate. A pixel electrode of each pixel cell of the TFT array substrate is configured to apply an electric field to control the rotation degree of the liquid crystal materials and hence perform display operation.

When the display device is an OLED display device, in the OLED display device, a pixel electrode of each pixel cell of a TFT array substrate is taken as an anode or a cathode and configured to drive organic light-emitting materials to emit light and hence perform display operation.

Although detailed description has been given to the present invention with the simple description and the detailed description in the above context, it is obvious to those skilled in the art that certain modifications or improvements may be made on the basis of the present invention. Therefore, the modifications or improvements made without departing from the spirit of the present invention should all fall within the scope of protection of the present invention.

What is claimed is:

1. A light guide plate for a LED backlight source, wherein the LED backlight source comprises a plurality of LED lamps arranged in a row in the first direction, and an LED lamp gap is formed between every two adjacent LED lamps; the light guide plate comprises a light guide plate body with a plurality of dots disposed thereon which are arranged in the first direction to form a plurality of dot rows and arranged in the second direction perpendicular to the first direction to form a plurality of first dot columns and a plurality of second dot columns, wherein each of the first dot columns corresponds to one of the LED lamps; each of the second dot columns corresponds to one of the LED lamp gaps; a light guide region is presented in the light guide plate body and is defined by taking centerlines of two adjacent LED lamp gaps as boundaries; and in the light guide region, the diameter of the dots in the same dot row is progressively increased from the middle to both sides, and the diameter of the dots in the same dot column is progressively increased along the direction far away from the LED lamp.

2. The light guide plate according to claim 1, wherein in the light guide region, the diameter of the dots in the same row is linearly increased from the middle to both sides.

3. The light guide plate according to claim 1, wherein in the light guide region, the diameter of the dots in the same dot column is linearly increased along the direction far away from the LED lamp.

4. The light guide plate according to claim 2, wherein in the light guide region, the diameter of the dots in the same dot column is linearly increased along the direction far away from the LED lamp.

5. The light guide plate according to claim 1, wherein a plurality of projections which are good in light transmission are formed on a light-incident side of the light guide plate body; the refractive index of material for making the projections is greater than the refractive index of air; and a slot space is formed by inner sides of two adjacent projections.

6. The light guide plate according to claim 5, wherein the plurality of the projections are located to correspond to the plurality of the second dot columns respectively.

7. The light guide plate according to claim 5, wherein the projections are made of PMMA or PC.

8. The light guide plate according to claim 5, wherein the inside of the slot space is rectangular in shape.

9. The light guide plate according to claim 5, wherein the bottom of the slot space is cambered in shape.

10. An LED backlight source comprising a bar and a plurality of LED lamps uniformly mounted on the light bar, the LED backlight source further comprising the light guide plate according to claim 1, wherein the light guide plate comprises a plurality of the light guide regions corresponding to the LED lamps respectively.

11. The LED backlight source according to claim 10, wherein a plurality of projections which are good in light transmission are formed on a light-incident side of a light guide plate body; the refractive index of material for making the projections is greater than the refractive index of air; a slot space is formed by inner sides of every two adjacent projections; each of the LED lamps is independently disposed in one of the slot spaces; and each of the projections is independently disposed in one of the LED lamp gaps.

12. The LED backlight source according to claim 11, wherein the width of the projection is less than the gap between two adjacent LED lamps; the transverse distance of the inside of the slot space is greater than the length of the LED lamp; and the depth of the slot space is greater than the height of the LED lamp.

13. A light crystal display device comprising the LED backlight source according to claim 10.

* * * * *